United States Patent [19]

Liberman

[11] Patent Number: 6,151,330

[45] Date of Patent: Nov. 21, 2000

[54] ELECTRIC POWER SUPPLY MANAGEMENT SYSTEM

[75] Inventor: Isidor Liberman, Givat Shmuel 51905, Israel

[73] Assignee: Powercom Control Systems Ltd., Givat Shmuel, Israel

[21] Appl. No.: 08/984,997

[22] Filed: Dec. 4, 1997

[30] Foreign Application Priority Data

Dec. 4, 1996 [IL] Israel ......................................... 119753

[51] Int. Cl.$^7$ ................................................ H04L 12/403
[52] U.S. Cl. ........................................... 370/449; 370/453
[58] Field of Search ................................... 370/449, 451, 370/453, 457, 254; 713/300

[56] References Cited

U.S. PATENT DOCUMENTS

| 5,239,495 | 8/1993 | Nanno et al. | 364/707 |
| 5,941,989 | 8/1999 | Klein | 713/300 |

FOREIGN PATENT DOCUMENTS

| 93/02515 | 2/1993 | WIPO . |
| 96/06478 | 2/1996 | WIPO . |

*Primary Examiner*—Huy D. Vu
*Assistant Examiner*—Alexander Boakye
*Attorney, Agent, or Firm*—Evenson, McKeown, Edwards & Lenahan, P.L.L.C.

[57] ABSTRACT

A communication protocol, designed for centralized power line networks, provides a solution for: automatic network mapping and adaptive routing, for automatic log-on of remote nodes and also for optimization of communication routes and control of the traffic volume.

A Central Unit (CU) permanent polls all the known Remote Nodes (RN) and a polled RN replies with a message. A new Remote Node (RN), which hears any polling command from the CU, transmits a Burst Log-On Message direct to the CU. A new RN, which hears a reply of polled RN, but not the polling message itself, transmits a Burst Log-On Message, using the replying RN as a relay. There maybe a route of several relays between the new RN and the CU and all of them are registered in the Log On message itself. When the CU receives the message from the new RN, it performs a log on of the RN, stores its route, and starts to poll it.

This process continues all the time, enabling an addition of new nodes. RN with no communication behaves as a new one and creates a new route, when the previous is no more available.

A permanent improving of the existing routes is achieved by using a special field in a message, that indicates the time the message has already traveled via the network. This field is incremented by each relay on the route, and further used by each RN, which hears the message, to improve its route to the CU. The criteria used by RN is the less the time—the better the route.

For data, such as a power demand, which is a function of time and should cover all the day, the quantity of data depends on the resolution in use. The system always tries to achieve the highest possible resolution, but if the collection cycle is too long, and the transmitted data doesn't cover the required period of time, the resolution and the quantity of data are automatically reduced to provide a continuous coverage of time.

2 Claims, 3 Drawing Sheets

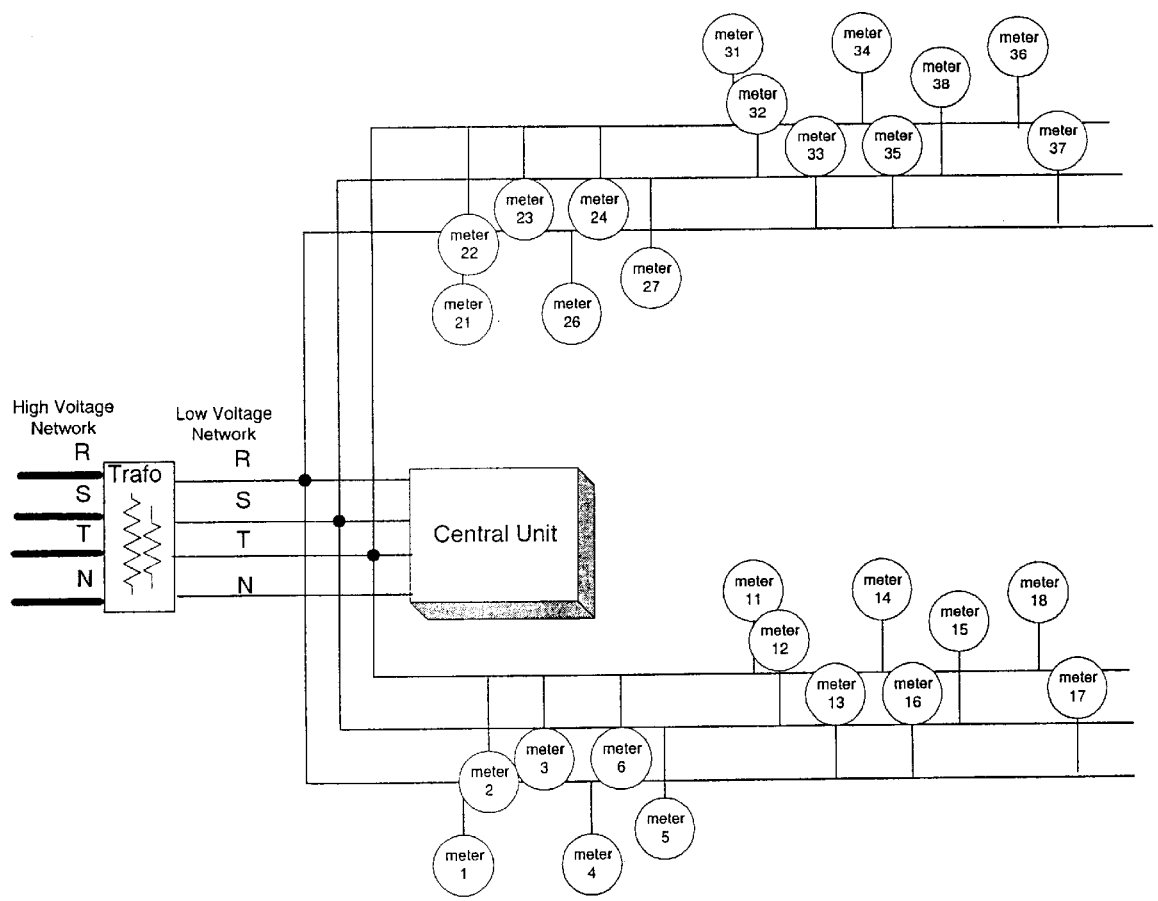
Figure 1 - typical PLC network

Figure 2 - Mapping Idea Example
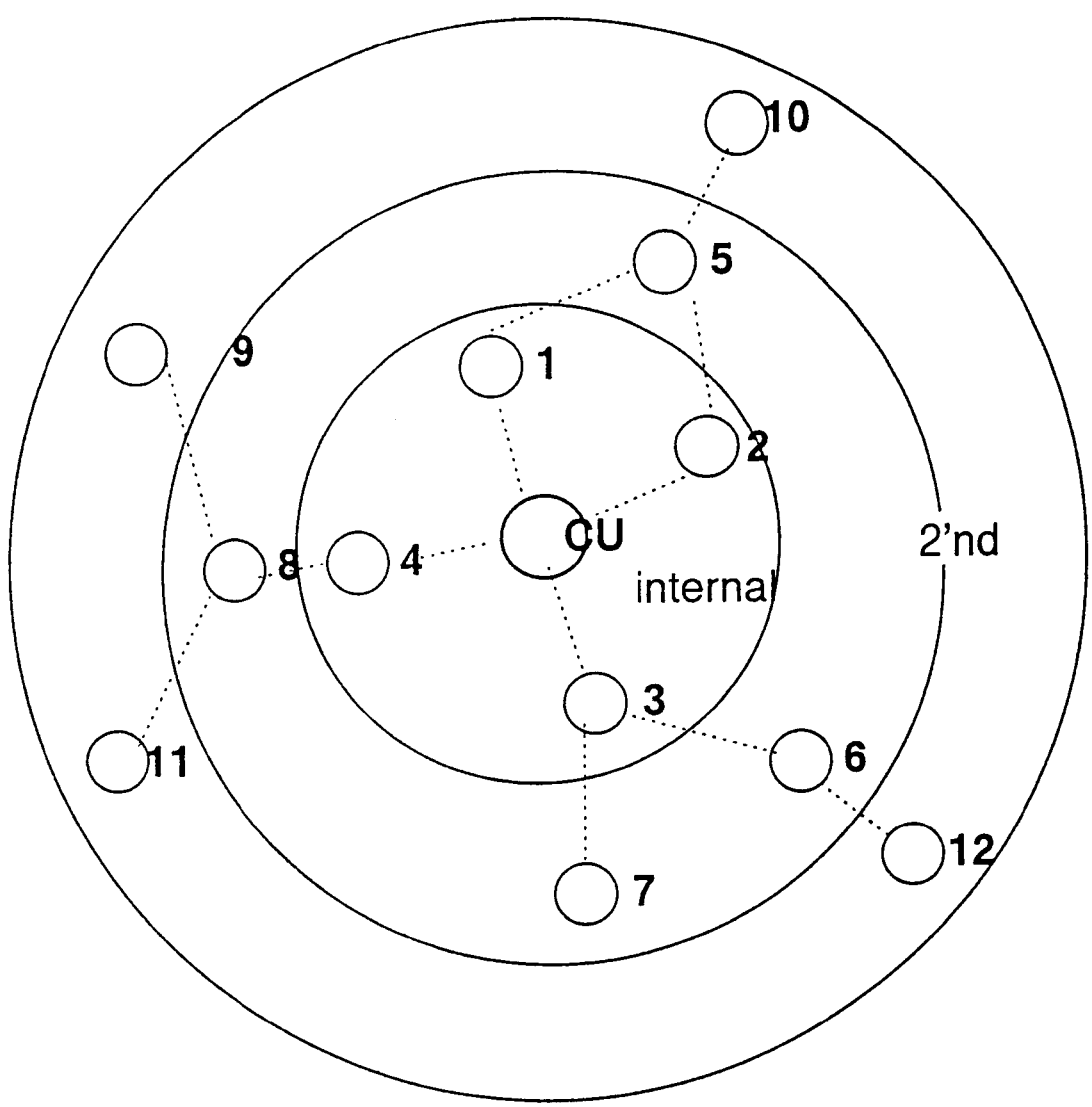

Figure 3 - Choosing the Best Neighbor
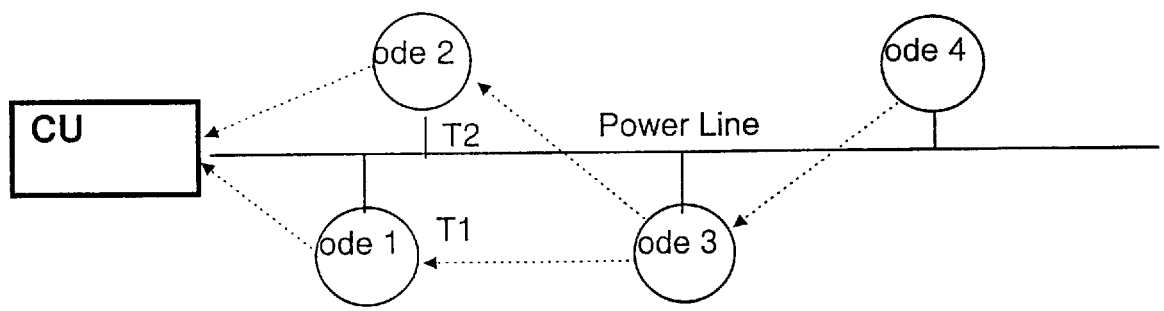
Figure 4 - Creating Routes in CU
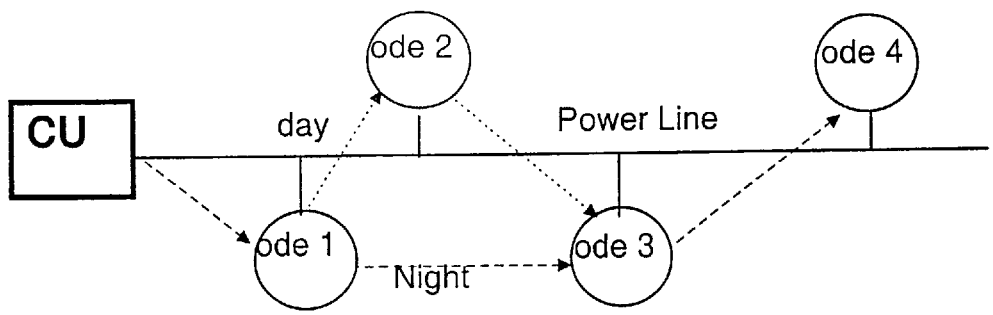

ELECTRIC POWER SUPPLY MANAGEMENT SYSTEM

TECHNICAL FIELD

This invention relates generally to the communication via Electrical Power Lines, but is also relevant to a large scale, centralized networks, no matter which media is used for data transfer.

More particularly the invention relates to automatic mapping and routing optimization of a communication between a Central Unit and Remote Nodes under hard and changing communication conditions.

BACKGROUND OF INVENTION

In a large part of communication systems, data is transferred between a central unit and remote nodes. In the electrical power systems, for which this communication protocol was especially implemented, but not necessary limited, the electrical power meters should transmit to a central unit the data collected by them. In general this data includes: consumption, power demand, status information and various events. On the other hand the central unit distributes to the meters: Time of Use tables, tariffs and various load control commands.

In such cases the data transmission is performed via the Electrical power lines. These are the electrical utilities proprietary and the use thereof does not require a special permission, (as for radio), or installation of data cables.

However, communication quality of the electrical lines is low and changing in time, because of noises, changing electrical loads and changing line impedance. Due to these phenomena the communication range varies from several hundreds of meters to something like 80 m. or even less.

The communication network contains all the meters for a Low Voltage Network (LVN), which means all the meters connected to one transformer. The number of meters may differ from 8, in countries like USA, to several hundreds.

The distance from the remote units to the central unit may sometimes take 1600 meters and more.

This situation requires re-transmission of messages via a number of relays, in order to transmit a data between a remote node and the central unit.

A typical network may look like the one in FIG. 1. As can be seen the CU is connected to 3 phases of power line in the vicinity of the transformer. There are 2 branches going from the transformer to 2 different directions.

Theoretically, if we know the meter's topology, we may assume that the closer the meter is to the central unit, the better the communication between them. Consequently, for a given meter, we may choose relays that are on the same phase between it and the Central Unit, ensuring good communication. For example, the meter 5 may be used as a relay for meters 12 & 15 on the phase S and the meter 6 for meters 11, 14 & 18 on T.

Unfortunately, in practice, such topological information does not exist, and if it does, there is no guarantee that the above assumptions are true. A close node maybe a very poor relay, due to local load and noises, and very often nodes on different phases have better communication than these on the same.

Moreover, if the connection was successfully established, as for example 12 & 15 via 5, the removing of meter 5 will destroy it.

Contrary to the above, the communication protocol according to the invention does not require any previous knowledge of the meters topology. The only conditions for the remote node to be automatically added to the Central Unit data base, and to perform a permanent communication with it, is that it should have a communication with at least one other remote node, which is already connected. In this case the new RN will automatically be found, logged on and the route to it will be constantly improved. The route will be adopted to changing conditions in the network.

By employing the system according to the invention the following principles and advantages are achieved:

1. Automatic log-on of remote nodes, by joint of a route of a known node;
2. Automatic mapping of a new installed Network, by recording all nodes together with their routes, reported as a part of message;
3. Optimization of routes, using a Message Traveling Time factor;
4. Creating dynamic routes to the central unit, by the Best Neighbor method;
5. Creating dynamic routes by the CU, using the Best Neighbor method and according to a time period statistic;
6. Combined Polling/Burst protocol, with dynamic Burst Period parameters;
7. Helping the messages by re-transmitting them by hearing nodes;
8. Controlling the traffic volume by reducing the data resolution.

DETAILED DESCRIPTION

The invention will now be described with references to the annexed drawings.

Automatic Log-On And Mapping

Basic Definitions

The protocol defines the behavior of 2 system segments: the Central Unit (CU) and the Remote Node (RN).

The CU operation is built up from 2 operational modes:
* Polling mode—when the CU sends polling commands to all known nodes;
* Burst mode—when it is waiting for the nodes log-on messages.

The CU starts to work in the Polling mode. If no node is registered in the data base it starts to poll an imaginary RN.

RN also operates in 2 modes:
* Known mode—RN receives polling messages from the CU and replays according to the received command.
* Lost/New mode—when RN is newly installed in the network or is lost, it did not get a polling message for 2 interrogation cycles or more. In this case it sends a Burst log-on message via a received route.

MAPPING PROCESS

General Description

Mapping means to find routes for all nodes. The system functions as follows:

1. The mapping process is constantly performed by the CU in both modes of operation: polling and burst. The difference is in the expected quantity of new nodes. There is no special mode for mapping.
2. At the beginning all nodes are in the New/Lost mode and there are no known nodes in the CU data base. The CU starts the polling cycle by sending a polling message to an imaginary node, with a reserved node ID. (There is no influence on the process if such an ID really exists.)

3. The polling message contains a time for the bursts start and a number of available time slots.

4. Each node, which receives the message, stores the CU as its neighbor, enters the Known mode and waits for a time to transmit a Log-on Burst Message. The time for burst is computed by each New/Lost node as follows: Time For Burst Start:, as received from the message, plus some function of node ID, in the range of the number of slots.

5. The CU enters the burst mode and waits. Upon receiving a reply message, it records the replying node in the data base as one that has a direct connection with the CU.

6. When the burst mode is finished, the CU computes new parameters for the burst mode: start time and a number of slots and enters the polling mode. Now it performs its first real interrogation cycle, transmitting polling messages to all the nodes in its data base. At this stage all the nodes are with direct connection, without relays in the route.

7. Each New/Lost node that receives the message stores again the CU as its neighbor. Each New/Lost node which did not get this message, but is done receive the polling nodes reply stores the last heard node as its neighbor.

8. All the nodes wait for the time of burst and transmit the Log-on Burst Messages to their neighbors. If the neighbor is the CU the procedure is as before. If it is another node it acts as relay and sends in turn the received message to its neighbor. At this time the relay maybe only a node which already did respond to the CU polling message and has a direct connection with the CU.

9. Now the procedure continues as follows:
* CU stores each new node received by it in the data base together with the route (one relay in the case above).
* In the polling mode, all the nodes are interrogated by sending to them polling messages via the stored routes.
* Each New/Lost node, which receives some node reply to the CU, or it's transmission as relay, registers it as its neighbor.
* When the burst time comes, it transmits its log-on message to its neighbor.
* Each node that receives a message, transmits it again to its neighbor, until the message arrives the CU.

MAPPING PROCESS EXAMPLE

The mapping process will be clarified in the following example:

As can be seen in FIG. 2 it is a system which is divided into 3 circuits. Nodes in the internal circuit hear the CU directly. Nodes in the 2'nd circuit hear some nodes from the internal circle, but not the CU directly. Nodes from the 3'd circuit hear the nodes from the 2'nd.

The system will function as follows:

1. The CU is now installed and there is no node stored in its data base. The CU sends polling messages to an imaginary node and waits a short time for bursts.

2. Nodes 1, 2, 3, and 4 receive the message and record a direct route to the CU. They transmit a burst polling message containing they ID numbers in the route.

3. The CU receives their messages and starts a polling cycle sending polling messages to 1, 2, 3 and 4.

4. Node 5 receives the replies of 1 & 2, storing the last replying node. Nodes 6, 7 receive the reply of 3. The nodes wait for the burst time and when it comes they transmit the burst log-on message via the received routes: node 5 via node 2, nodes 6 & 7 via node 3.

5. Now the CU has already received the nodes from 1 to 8 and starts to send polling messages to them via the received routes.

6. Nodes from the 3'd circle receive their replies as follows: 9 & 11 from 8, 12 from 6, 5 from 10. The 3'd circle nodes log the routes and when the burst time comes they transmit the log-on messages to them.

7. Finally the nodes from 3'd circle get routes as follows:
* 9: via 8 & 4;
* 10: via 5 & 2 when also 1 is possible instead of 2;
* 12: via 6 & 3.

OPTIMIZATION OF ROUTES

In the above described example the CU "knows" all the nodes after 3 cycles of interrogation together with their routes and theoretically it may now perform the data collection via these routes. In practice the communication between nodes has always some probability, in most cases less than 1, which also changes in time.

Because of the communication probability, the messages should be transmitted more than once to get a connection. Also, not always the route received by some node on the beginning is the best choice. For example, referring to FIG. 1, node 5 had created a connection with CU via node 2, but it may happen that in most cases the connection via 1 is better.

In a real network it is impossible to now apriori the communication probabilities. The probability of connection is translated into a number of retries required for achieve the connection in both directions, from CU to a node and back. Each retry requires time. Also transmission from one relay to another requires time, and the number of retries required for connection establishment is equivalent to the time required for collect a data from a node.

A route with a high number of relays may have a better communication probability than a short one, but the time required for a message successful transmission may be longer.

The system continuously performs optimization on the time required for the data transmission, which is equivalent to the number of retries.

The basic idea for this is as follows.
a) CU sends polling messages to all the nodes in its data base. Each message contains the number of retries performed for this message.
b) CU initializes this field to 0 and increments it with each new transmission, until receiving an Ack from the first relay on the route.
c) Each relay on the route also increments this field with each re-transmission and so does the target node, when replying to the CU command.
d) In addition each message contains a unique ID, built up from 2 fields: the Cycle Number and the Message Sequence Number in the cycle.
e) Each node process all the messages in the network, even it itself should not respond to them, as a relay or a target. Each node maintains a list of routes, where each route keeps the Message ID from which it has achieved the route and the number of retries specified in the message and the first time received.
f) The routes are sorted by a node according to the number of retries. From the node point of view, supposing the received message was addressed to it, the number of retries in the message is also the number of retries required for CU to connect it. This means that the route with the smallest number of retries it receives, is the best one for him.

g) The next time the node responds the CU command, or it connects CU by a burst message, it will do this via the new route. The CU in turn will save the last received route for it next polling command.

h) In order to prevent a route, which accidentally succeeds in some specific point of time, to be the best one, the node and the CU compute statistics for the known routes. The statistic takes into account the number of retries from the previous cycles, when their weights are smaller and smaller as the time progresses.

CREATING DYNAMIC ROUTES BY THE BEST NEIGHBOR METHOD

From Remote Node

In a static communicational environment, the approach of the best route may be good enough and the network after some time will achieve a state of the best route for each node. In the Electrical Power Line networks, the communication probability varies due to the electrical loads and line noises, and a relay that was good some times, maybe bad when required.

For example, the following situation as described in FIG. 3.

Suppose that the Node 4 had received the following route at the time T1: node 3, node 1, CU, as the best the route. However, at time T2, when the Node 4 wants to create a connection with CU, there is no communication between 3 and 1, but a good connection between 3 and 2. Node 4 has very little chance to know this, because it has no connection at all with 2 & 1. Node 3 in order has a good chance to know it because it should receive all the Node 1 and Node 2 transmissions. So it is much better for node 4 to send the message to Node 3 and not to specify all the route to CU. Node 3 in order, transmits the message to the next relay, 2 or 1, according to its up-to-date situation.

CREATING DYNAMIC ROUTES IN CU

The problem of creating dynamic routes, as described above for a remote node, exists also in the CU and is even a little bit more complicated. The CU is a single point in the network and each remote node knows how to transmit the message to it via its best neighbor. However, when the CU transmits the message to a remote node, it have to specify full route as the nodes (See FIG. 4).

An additional problem is that the CU gets the routes from received messages at different periods of the day and in general the best night routes, (according to the minimal time criteria), are not good during the day.

If the CU keeps the route to the nodes as it received it, it is impossible to connect node 4 via the route received at night.

The CU acts as follows:

* For each node it keeps only the best neighbors, as received from the message;
* For each neighbor it keeps a statistic for relevant time periods (6 periods of 4 hours are enough);
* The information is arranged as follows:

| Node | Neighbors | period 1 | period 2 | ... | period N |
|---|---|---|---|---|---|
| $ND_1$ | $ND_{11}$ | $P_{111}$ | $P_{211}$ | | $P_{N11}$ |
| | $ND_{12}$ | $P_{112}$ | $P_{212}$ | | $P_{N12}$ |
| | ... | | | | |
| | $ND_{1m}$ | $P_{11m}$ | $P_{21m}$ | | $P_{N1m}$ |
| $ND_2$ | $ND_{21}$ | $P_{121}$ | $P_{221}$ | | $P_{N21}$ |
| | $ND_{22}$ | $P_{122}$ | $P_{222}$ | | $P_{N22}$ |
| | $ND_{2m}$ | $P_{12m}$ | $P_{22m}$ | | $P_{N2m}$ |
| ... | ... | ... | ... | ... | ... |
| ... | ... | ... | ... | ... | ... |
| ... | ... | ... | ... | ... | ... |
| $ND_n$ | $ND_{n1}$ | $P_{1n1}$ | $P_{2n1}$ | | $P_{Nn1}$ |
| | $ND_{n2}$ | $P_{1n2}$ | $P_{2n2}$ | | $P_{Nn2}$ |
| | ... | | | | |
| | $ND_{nm}$ | $P_{1nm}$ | $P_{2nm}$ | | $P_{Nnm}$ |

$ND_k$ is the k"th node in the network. $ND_{KJ}$ is it's k'th neighbor and $P_{LKJ}$ is the probability of a connection between them, in the L'th period time.

The best neighbors are collected from the received messages for each node. The probability is computed as the ratio of the number of times the neighbor was received in the tested time period and the sum of retries in the received replies. If no answer was received, the number of retries is assumed to be the maximal one, 20* no of relays.

For sending the message from CU to the node $k^1$, during the period time i, the route is; $ND_{k^1}, ND_{k^2}, \ldots ND_{k^n}$, when for each two close nodes, $ND_{k^j}$ & $Nd_{k^{j+1}}$ the communication probability $P_{i, k^j, k^{j+1}}$ is the maximum on $P_{i, k^j, j}$ and j varies from 1 to m.

COMBINED POLLING/BURST PROTOCOL

There are 2 possibilities to receive messages from nodes in the CU.

a) As a response to a polling command;
b) When the node transmits a burst message upon event; (Time or something else).

Transmitting a burst message is generally more efficient as it does not require a message received from the CU, which means a one way communication probability. However, transmitting messages synchronically generates collisions between them and in a network of several hundreds of nodes the method of free burst transmission is not efficient at all.

On the other hand, using only a polling method disables the new nodes to join the system. This also disables creation of new routes if a known node becomes lost and its known route is destroyed.

The present protocol innovation is to use the polling messages to transmit to all new or lost nodes, the burst time parameters, its start and the number of available time slots.

The system uses 4 protocol methods together, in order to manage the communication traffic:

* CSMA—used on the single unit level, (CU and RN), to prevent collision between small quantities of messages.
  * Polling of all known nodes as a main mode for data collection and the system mapping.
  * Slotted burst in computed time slots—for the new nodes, mostly used when the system is in the installation phase.
  * Immediate burst for nodes with a bad communication, under a CSMA control only.

The CSMA mechanism is an inherent part of the Intellon modem, used by the system on the PLC media. The CSMA purpose is to avoid a start of transmission of any station, when a carrier is detected on the line. This protocol is efficient only when the hearing probabilities are high and number of stations low. In a typical PLC network, especially when it is in the installation phase and many nodes start to send their log-on messages, this protocol does not work and the stations jam each other.

Polling is the basic communication method. The CU transmits the polling commands to all the known nodes in the system. Nodes respond only to the polling command, so there is no mutual interference between them. In large systems, with a poor time synchronization, this is the only method that enables safe periodical data transferring. This method however does not enable new nodes to join the system and the data collection from nodes with a low communication probability is hard.

In the Slotted Burst Method the nodes may send messages upon event in specified time slots. The CU computes the start and the number of slots of the burst period, according to the time required for the polling cycle and the expected number of new nodes. After this, CU transmits these parameters in each polling message. They are repeated by each relay and target node and received by New/Lost nodes. Nodes that do not receive any message shall not send any burst message as the probability that somebody will hear them is very low.

Generally, we want to perform the burst period only after finishing the polling cycle for all known nodes. However, the time between bursts should be limited to some value that represents the communication stability. If the time is exceed there is a high probability, that for a large part of New/Lost nodes the roots they did receive during the polling cycle, will be no more available. In the PLC case the time should be no longer than half an hour.

The Number of Slots is initialized to 4 and it is always the smallest number of available slots. Each slot is 10 seconds wide, which in average enables 20 not interfered retries of one node.

Each New/Lost node, after receiving the burst period parameters, computes its time for log-on transmission as follows:

T=Bursts Start Time+(ND$_{id}$)modulo, Number Of Slots where NDid is the identification number of node.

During the burst period, the CU waits for the bursts messages and does not send polling commands at all. When the burst period is finished, the CU computes the new number of slots as the number of New/Lost nodes*3.

The reasoning for this is as follows:

When a large number of nodes are added at once, a rapid enlarges of the Burst Time is required. This may happen for example when a new CU is installed in the network or a branch of electric cable is moved from one transformer to another.

Increasing the burst time period, enables more new nodes to join the system without interference, but on the other hand this reduces the time for polling, which in turn decreases the chances of nodes to receive proper routes. When there are many Burst Log-on messages, we assume that there are also many new nodes and we may assume that because of collisions we do not receive a part of them. Increasing the Burst Time as described, seems to be a good solution as the time increases rapidly as long as the number of new nodes increases and is reduced rapidly as the number decreases.

HELPING MESSAGES

The methods described above may be insufficient when an On Line connection with nodes is required because the communication conditions may change dramatically from the last received route.

The idea is that nodes may volunteer to help the received message to reach their goal (the target node, relay or CU). This method generates a high number of messages transmitted in parallel and should only be used for messages with high priority.

The messages may be sent forward, from the CU to node, or backward, from a node to the CU. The treatment for each case is different.

HELPING BACKWARD MESSAGES

This case is very simple because each known node in the network knows the way to the CU through the list of neighbors it keeps. If the node receives a message addressed to the CU it checks if there is an Ack to this message. If after a number of retries no Ack was received the nodes will transmit the message to their neighbors.

HELPING FORWARD MESSAGES

The case when the message is transmitted from the CU is more complicated. This is because in general the nodes have a limited memory and they have no possibility to keep all the communication connections. Additionally, during its work the CU is all the time transmitting polling messages permanently giving information about its communication position relative to the receiving nodes. This is not the case with the nodes as they are generally silent until receiving a pole command or some other event.

Each node maintains a list of "needed help" nodes on the FIFO base. Each node inserts into the list nodes which transmit burst messages if they receive them after no more than 2 retries. This assures that only a small number of nodes, with a good connection, may volunteer to help.

When some node receives a message addressed to another node that is in its list, it starts to check if the addressed node transmits Ack. If it does not receive an Ack from for more than 5 retries, it computes a time for help. The time is the (Node ID) modulo 10*Tbase, where Tbase is a time required for 3 retries.

When the time comes the node will transmit the received message without changes. If during the waiting time, or during the transmission, the node receives Ack it cancels its transmission.

CONTROLLING THE TRAFFIC VOLUME

For some data, such as a power demand, which is a function of time and should cover all day, the quantity of data depends on the resolution we use.

The theoretical system capability for data transfer is limited by the communication transfer rate and by the number of retries required for achieving contact with some node. In the system for which this protocol was implemented, we may receive a contact with a node of something as 2 retries in good conditions, or in 60 retries in bad. This is equivalent to time varying between 1 to 30 sec of communication.

If a large number of nodes obtain bad communication conditions, the cycle of data collection became longer than the time that may be covered by the data in a single message. This causes that the collected data gets increasing delay, which finally is higher than the storage capability of a node and creates holes in it.

To avoid the data holes, the system may reduce the amount of received data by decreasing its resolution. The demand data is obtained from remote nodes by the CU when they reply to a polling command. Each such command contains the required demand start time and its resolution. Before polling some node, the CU checks how much demand data is missing. It compares it with the cycle period and the maximal quantity of data that maybe transmitted in one message. If the data delay already exceeds the message capability, the CU computes the new resolution as follows:

Let be:

ED—Existing Delay;

MN—Maximal Number of elements in a single message;

TC—Time for the full Cycle performance;

RES—resolution in time of the single data element.

So the delay after NC cycles is:

Delay=ED+(MN*RES−TC)*NC where MN*RES is the time covered by a single message.

If MN*RES−TC<0, than the delay will decrease, else it will increase or stay the same.

If we want to close the delay in NC cycles than the required resolution is deducted as follows:

Delay=ED+(MN*RES−TC)*NC=→MN*RES*NC=TC*NC−ED which gives RES=(TC*NC−ED)/MN*NC.

What is claimed is:

1. A process for communication via electronic power lines comprising:

(a) constantly performing a mapping process by a central unit in both polling and burst modes of operation, wherein a difference is in an expected quantity of new nodes, there being no special mode for mapping;

wherein, in the beginning, all nodes are in a new/lost mode and there are no known nodes in the central unit data base, the central unit starting a polling cycle by sending a polling message to an imaginary node, with a reserved node ID, there being no influence on the process if such an ID really exists;

wherein the polling message contains a time for a start of bursts and a number of available time slots;

wherein each node, which receives the message, stores the central unit as its neighbor, enters a known mode, and waits for a time to transmit a log-on burst message, a time for burst being computed by each new/lost node by way of time for burst start, as received from the message, plus some function of node ID, in a range of the number of slots; and wherein the central unit enters the burst mode, waits, and, upon receiving a reply message, records the replying node in the data base as one that has a direct connection with the central unit;

(b) computing new parameters and entering the polling mode when the burst mode is finished, the new parameters being, for the burst mode, start time and a number of slots, the control unit performing its first real interrogation cycle when it enters the polling mode and transmitting polling messages to all the nodes in its data base, all the nodes at this stage being in direct connection, without relays in route;

wherein each new/lost node that receives the message stores again the central unit as its neighbor, each new/lost node which did not get this message, but is done receiving the polling node reply, storing the last heard node as its neighbor;

wherein all nodes wait for the time of burst and transmit the log-on burst message to their neighbors;

wherein when a neighbor is the central unit, the procedure is as before;

wherein if the neighbor is another node, it acts as a relay and sends, in turn, the received message to its neighbor; and wherein the relay may be only a node which already did respond to the central unit polling message and has a direct connection with the central unit;

(c) storing each new node received by the central unit in the data base together with the route;

(d) interrogating, in the polling mode, all nodes by sending to them a polling message via stored routes;

(e) registering each new/lost node, which receives some node reply to the central unit, or its transmission as relay, as its neighbor; and (f) transmitting a log-on message to its neighbor when the burst time comes;

wherein each node that receives a message transmits it again to its neighbor until the message arrives at the central unit.

2. A process as claimed in claim 1, wherein optimization of routes is achieved by:

(a) sending polling messages from the central unit to all the nodes in its data base, each message containing the number of retries performed for the message;

wherein the central unit initializes the field to 0 and increments it with each new transmission until receiving acknowledgment from the first relay on the route;

wherein each relay on the route also increments this field with each re-transmission as does the target node, when replying to the central unit command;

wherein each message contains a unique ID, built up from two fields, namely, a cycle number and a message sequence number in the cycle; and wherein each node processes all the messages in the network, even when it itself should not respond to them, as a relay or a target, each node maintaining a list of routes, where each route keeps a message ID from which it has achieved the route and the number of retries specified in the message and the first time received;

(b) sorting the routes by a node according to the number of retries, wherein, from the node point of view, supposing the received message was addressed to it, the number of retries in the message is also the number of retries required for the central unit to connect it, such that the route with the smallest number of retries received is the best one for the node;

wherein the next time the node responds to the central unit command, or connects the central unit by a burst message, it will do so via the new route, the central unit, in turn, saving the last received route for its next polling command; and (c) preventing a route which accidentally succeeds in some specific point of time from being the best one by having the node and the central unit compute statistics for the known routes which take into account the number of retries from the previous cycles, when their weights are smaller and smaller as time progresses.

* * * * *